United States Patent [19]

Donaldson

[11] 4,261,204

[45] Apr. 14, 1981

[54] CONDUIT FOR GUIDING FIBER OPTIC VIEWING DEVICE

[75] Inventor: James A. Donaldson, Dodge Center, Minn.

[73] Assignee: Donaldson Construction Co., Inc., Dodge Center, Minn.

[21] Appl. No.: 74,864

[22] Filed: Sep. 12, 1979

[51] Int. Cl.³ .......................... G01N 1/22; G01M 3/04
[52] U.S. Cl. ........................... 73/421.5 R; 73/40.5 R; 340/870.29; 350/110
[58] Field of Search .............. 73/421.5 R, 272 A, 431, 73/40.5 R, 40; 250/227, 231 R; 350/110, 96.26; 340/188 R, 190; 116/DIG. 26

[56] References Cited

U.S. PATENT DOCUMENTS

| | | | |
|---|---|---|---|
| 2,815,258 | 12/1957 | Coolidge | 73/272 A X |
| 3,441,923 | 4/1969 | King | 340/188 R X |
| 3,573,773 | 4/1971 | O'Hanlon | 340/188 R |
| 3,690,775 | 9/1972 | Cousins | 350/96.26 X |
| 3,699,950 | 10/1972 | Humphrey, Jr. et al. | 350/96.26 X |
| 4,204,115 | 5/1980 | Boldridge, Jr. | 250/227 |

OTHER PUBLICATIONS

MSA Data Sheet, 08-00-03.
MSA Data Sheet, 08-00-04.
AO Fiber Optics-The Complete Line From American Optical.

Primary Examiner—Gerald Goldberg
Assistant Examiner—Joseph W. Roskos
Attorney, Agent, or Firm—Merchant, Gould, Smith, Edell, Welter & Schmidt

[57] ABSTRACT

A system and apparatus by which an observer outside a building can read the indices of an instrument located within the building and can check the presence of combustible gas in the atmosphere within the building, comprising a guide tube extending between a weatherproof receiving station outside the building and a transmitting station at the meter, including accessory means for confining gas entering the building around a gas main and conducting it to the transmitting station.

6 Claims, 5 Drawing Figures

4,261,204

CONDUIT FOR GUIDING FIBER OPTIC VIEWING DEVICE

TECHNICAL FIELD

This invention relates to the field of apparatus and systems for use by the public utilities organizations in observing and inspecting equipment installed in their customers' homes without requiring entry into those homes.

BACKGROUND OF THE PRIOR ART

Almost all homes receive services from public utilities such as water, gas, telephone and electric companies, and most of these services require metering. In the past it was the almost universal practice to install the necessary meters within the building where consumption of the commodity took place, and this required regular access thereto by utility employees to read the meters. Not only was this annoying to the customers, but it also raised complications for the meter readers, who frequently had to return to particular buildings numerous times to find someone at home and thus gain admittance.

To some extent, this problem is alleviated by installing meters external to the building. This expedient is better adapted for use with electricity, because of the nature of the commodity, which does not freeze or pollute the atmosphere, and because of the properties of the metering equipment itself, which is less subject to interference by reason of vagaries of the weather. Accordingly periscopic and other forms of equipment have been devised by which a utility employee outside the house can read a meter within the house, usually in the basement thereof.

A special problem arises when a house is served with gas from a street main. It has been found that the piping sometimes develops a leak, and the leaking gas follows the outer surface of the pipe, sometimes for considerable distances, rather than dissipating into the soil around the pipe near the leak, frequently entering a customer's home through the wall and creating an unpleasant and sometimes hazardous situation.

Technical developments in the optical industry have resulted in the availability of instruments, known for example as Fiberscopes, in which a probe made up of an elongated bundle of fibers of material such as glass is associated with an objective lens at one end and an eyepiece at the other end, to enable vision at the eyepiece of the field of view toward which the objective is directed, even though the bundle may be curved as necessary to avoid obstacles to direct vision between the viewed and viewing sites. Such Fiberscopes are known with two sets of fibers and a built-in light source, so that the field of view may be observed without other illumination.

Apparatus of this sort is quite expensive, and it is not economically practical to install a fiber optics bundle in the home of each customer.

Chemical technology has also advanced to the point where combustible gas indicators known, for example, as Gas-scopes or Explosimeter Indicators are available in which a sample of air is aspirated through a calibrated instrument and the presence of combustible vapors drawn through a probe is made known in quantitative terms. These instruments are also relatively expensive and not adapted for installation generally in every customer's home.

SUMMARY OF THE INVENTION

My invention comprises a system and apparatus for enabling a public utility employee equipped with presently available Fiberscope and combustible gas indicators to read the utility meters in customers' homes, and check the atmosphere therein for leaking gas, without entering the building at all. The apparatus comprises a guide tube sized to pass the probes of observing instruments and extending from a transmitting station at the meter site to a receiving station at a site outside the building. The receiving station is designed to be weather resistant and to include locking or other means limiting access to the end of the guide tube to authorized personnel. The transmitting station includes an adapter, including a position stop arrangement by which the objective of an optical probe may be located at a position wherein it can illuminate and observe the indices of the meter to be read. Also included is a gas sampling accessory for confining any gas leaking into the building around the gas main and conducting it to the adapter where it is accessible to a gas indicator probe. Special fittings for use at the receiving and transmitting stations are included.

Various advantages and features of novelty which characterize my invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there are illustrated and described certain preferred embodiments of the invention.

DETAILED DESCRIPTION OF THE INVENTION

Figure 1:
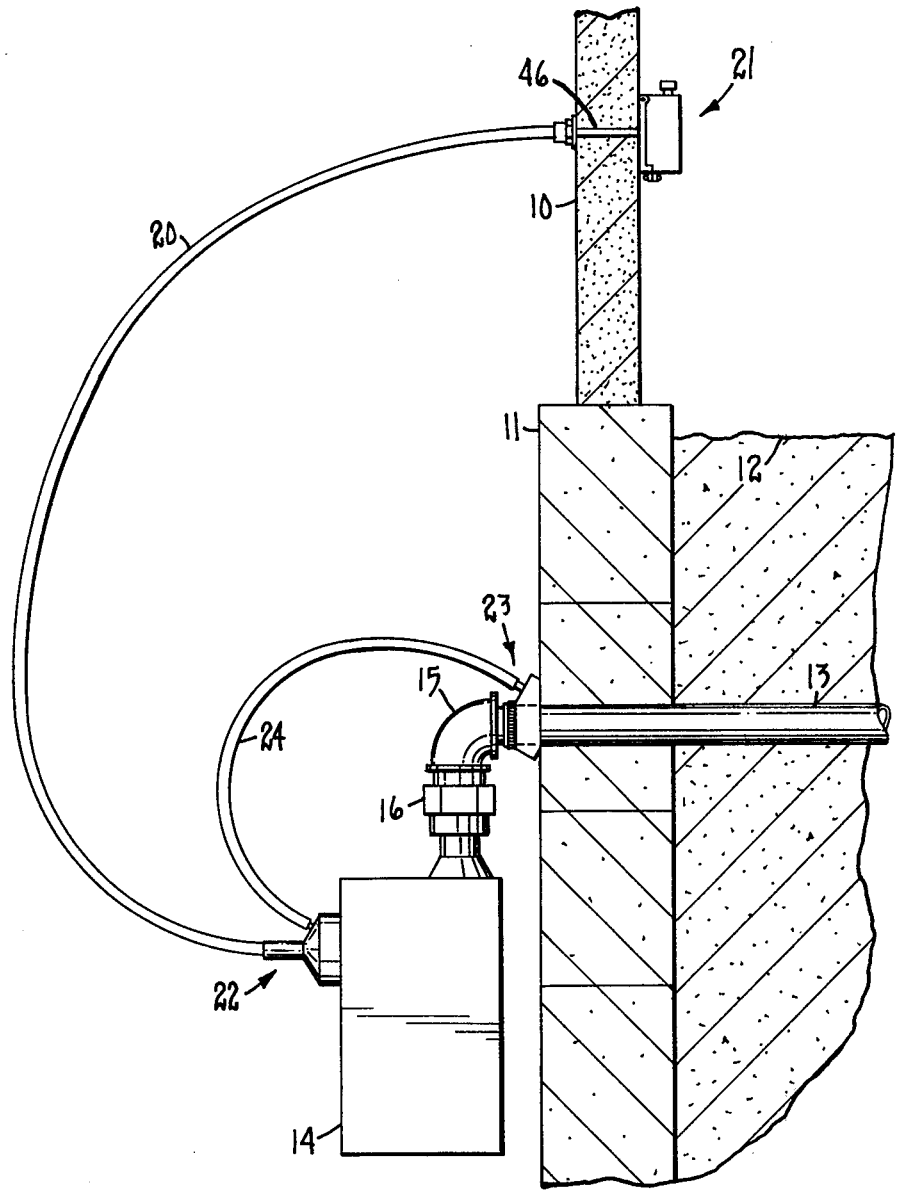
FIG. 1 is a schematic showing, partly in section, of the apparatus making up my inventive system.

Turning first to FIG. 1, the wall 10 of a building rests on a foundation 11 extending below ground line 12. The building is supplied with gas through a servic pipe or main 13, gas consumption being measured by a meter 14, coupled to pipe 13 by a suitable elbow 15 and coupling 16.

A guide tube 20 extends between a receiving station 21, outward of the building and above ground level, and a transmitting station 22 at meter 14. A gas sampling accessory 23 is connected to transmitting station 22 by a conduit 24. Tube 20 is sized to pass as an observation probe either a fiber optics bundle or a simple gas sampling tube. The length of tube 20 is less than the length of available fiber optics bundles, and the tube has no changes in direction too sharp to permit passage of a probe from the receiving to the transmitting stations.

Figure 2:
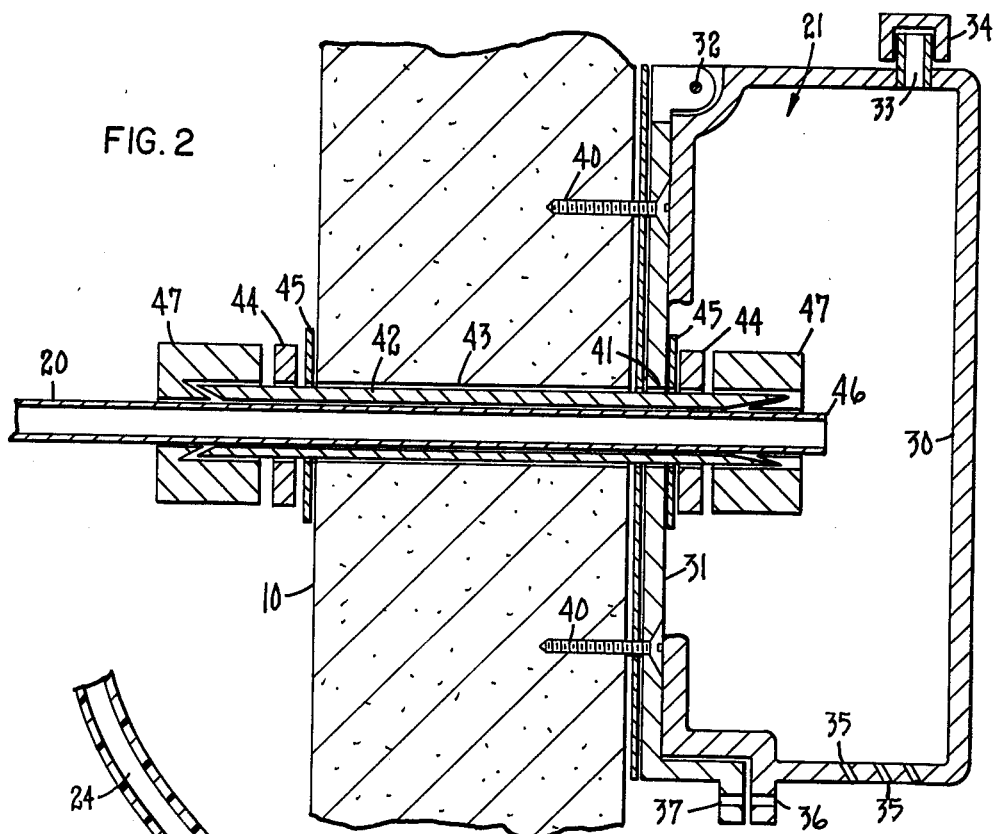
FIG. 2 is a schematic sectional view of a receiving station according to the invention.

Receiving station 21 is shown in FIG. 2 to comprise a housing 30 hinged to a base plate 31 by a pin 32. Housing 30 is provided with a vent 33 having a weather cap 34, and with drain and vent holes 35. The housing and the base plate have aligned holes 36 and 37 respectively for receiving appropriate locking devices not shown.

Base plate 31 is secured to wall 10 by suitable fasteners 40, and is bored at 41 to pass a pipe nipple 42 which also passes through a hole 43 in wall 10 and has ends threaded to accept nuts 44: washers 45 may be provided as necessary. Nipple 42 is sized to pass tube 20, one end 46 of which is secured in nipple 42 by compression fittings 47.

Figure 3:
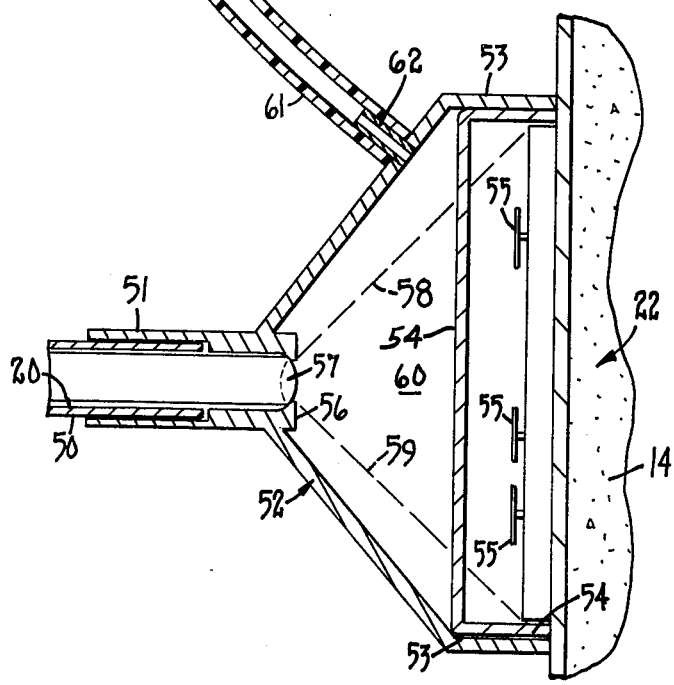
FIG. 3 is a schematic showing, partly in section, of a transmitting station according to my invention.

FIG. 3 shows that other end 50 of tube 20 is cemented or otherwise secured at transmitting station 22 in the sleeve 51 of an adapter 52 configured to taper outwardly from sleeve 51 to a rim 53 sized and configured to conform with the transparent cover 54 of meter 14, through which the meter indices 55 are visible. Sleeve 51 is positioned in apposition to the center of the field of meter indices, and at its inner end is configured as or provided with a stop 56 for limiting the passage of a fiber optics bundle through the tube 20. By this means the field of the objective lens of the bundle, suggested in the figure at 57, is properly positioned to cover the index field suggested by the broken lines 58, 59, and is spaced from the meter by a proper distance, determined by the focal length of the objective lens.

Figure 4:
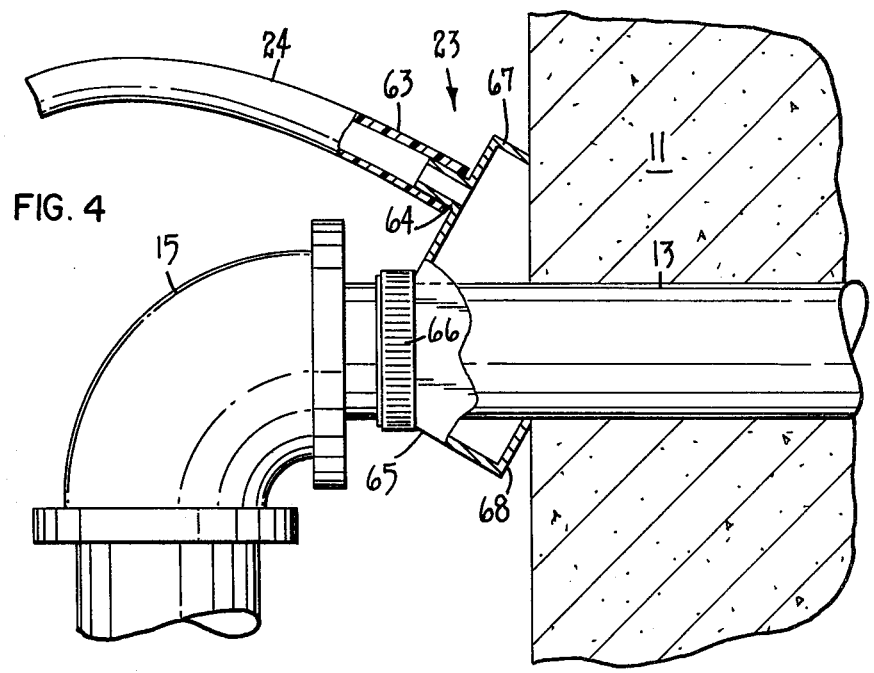
FIG. 4 is a schematic showing, partly in section, of a gas sampling accessory for use with my invention.

Although not necessarily a hermetic seal, the fit between rim 53 and cover 54 is sufficiently tight that a substantially closed chamber 60 is formed with adapter 52. One end 61 of conduit 24 is connected to this chamber by means of a tap or nipple 62: the other end 63 of conduit 24 is connected to a nipple 64 forming part of gas sampling accessory 23. As shown in FIG. 4, accessory 23 comprises a resilient enclosure having a small open end 65 adapted to be secured around gas pipe 13 by clamp 66, and a large open end 67 spaced from end 65 and comprising an inturned lip 68 for engaging wall 11. End 65 is clamped to pipe 13 at such a site that the resilience of the enclosure maintains substantially sealing contact of lip 68 against the wall.

It will be evident from consideration of FIGS. 1-4 that, should any gas leak through wall 11 around pipe 13, it will be confined in the enclosure of accessory 23 and conducted by conduit 24 into adapter 52, so a sampling tube or probe inserted through tube 20 may detect such gas if it is present. If there is unusually great gas leakage, tube 20 further functions to conduct the gas out of the building through housing 30 and the associated vents, even when no observations are being made through tube 20.

Figure 5:
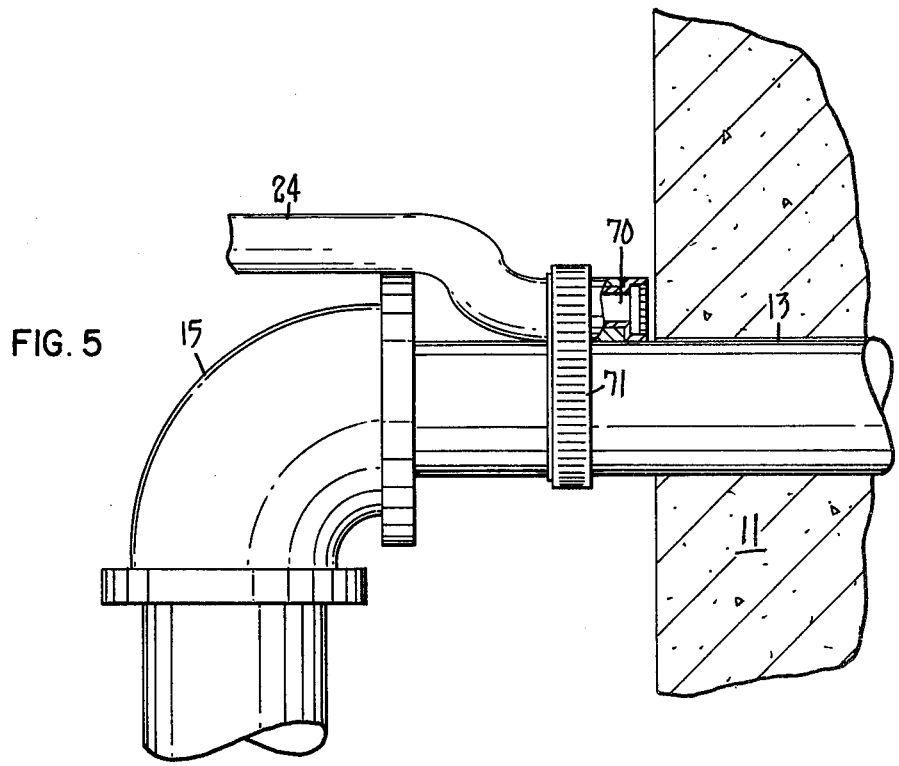
FIG. 5 is a view similar to FIG. 4 showing a modified gas sampling accessory.

A second embodiment of this portion of the invention is shown in FIG. 5. Here conduit 24 is simply connected to a gas pervious tip 70, and secured to pipe 13 by a clamp 71. This arrangement may not continuously conduct gas out of the building, but when a probe is inserted through tube 20 into adapter 52 and aspiration is begun, air from tip 70 is drawn into the indicator and the presence of leakage becomes evident.

While I have shown the invention as used for enabling the reading of a gas meter, it is evident that by suitable design adapter 52 can be configured to conform with a water meter or electric meter as well, and that its gas sampling function is unchanged regardless of what commodity is the one being metered. It is also evident that for buildings without gas service conduit 24 and members 62–71 may be dispensed with.

OPERATION

The method of installing the components of my invention is for the most part apparent, but it should be pointed out that for new installations accessory 23 can simply be slid over the end of pipe 13 before elbow 15 is made on. For old work, accessory 23 may be slit, applied, and closed with cement, or equivalent structural modifications may be accomplished.

For most of the time the components simply remain in position as shown in FIG. 1. On a regular schedule, or at any time desired, as for example on change of occupancy, the meter reader unlocks housing 30, pivots it away from plate 31, and inserts the objective of his Fiberscope into end 46 of tube 20 until it engages stop 56. He may now read indices 55, supplying illumination from his Fiberscope as necessary. After recording the reading he withdraws the fiber optics bundle and locks housing 30. If it is part of his schedule of duties, or if there is a suspicious odor at receving station 21, the probe of a gas indicator may be inserted down tube 20 into adapater 52 and gas drawn therefrom by aspiration to check for the presence of combustible gas: this is preferably done before the insertion of the fiberglass bundle, if both operations are to be performed at the same visit to the premises.

From the foregoing it will be evident that I have invented a system and apparatus for enabling the observation of a meter within a building from outside the building, using presently available portable instrumentation, and that the components of my invention include a gas sampling accessory which enables one outside the building to also observe whether or not there is gas leakage along a supply pipe therefor into the building.

Numerous characteristics and advantages of my invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

What is claimed is:

1. In combination:
   a guide tube extending smoothly between a receiving station and a transmitting station;
   means securing one end of said tube at said receiving station to enable ready insertion therethrough of an elongated flexible observation probe;
   and adapter means at said transmitting station for securing the other end of said tube to a meter to be read in spaced apposition to the indices thereof, said adapter means comprising a substantially sealed enclosure,
   and conduit means connecting said enclosure with a site for possible undesired appearance of detectable gas.

2. A combination according to claim 1 in which the last-named means comprises a gas sampling accessory for surrounding a pipe as it emerges from a wall to confine any gas moving through said wall along the outside of said pipe, and means conducting said gas to said enclosure for detection through said guide tube.

3. A combination according to claim 2 in which said accessory comprises a resilient enclosure having first and second spaced ends, said first end being adapted for clamping around a pipe in sealing relation thereto in proximity to said wall, and said second end being adapted to closely engage said wall by reason of the resilience of said body and the proximity to the wall of the site of clamping of said first wall to said pipe.

4. A building having a wall;
a gas pipe entering said building through said wall;
a gas meter within said building having indices for observation to determine consumption of gas;
a guide tube extending smoothly from a first end proximate said meter to a second end outside said building;
means securing said second end of said tube at a site outside said building to enable ready insertion of a fiber optics bundle endwise thereinto;
adapter means at said meter for securing the first end of said tube to said meter in spaced apposition to said indices to enable reading of said indices through said guide tube;
and means for surrounding said gas pipe as it emerges from said wall to confine gas moving through said wall along the outside of said pipe and conduct said gas to said enclosure for detection through said guide tube.

5. A gas sampling arrangement comprising a resilient enclosure having a small open end spaced from a large open end,
said small end being adapted for clamping about a gas pipe,
and said large end having an inturned lip adapted to engage in substantially sealing relation a wall through which said pipe projects.

6. An adapter comprising, in combination:
a hollow body tapering from a sleeve at a first end to a rim at a second end, said rim being configured for substantial sealing engagement with the transparent index cover of a meter,
and said sleeve being configured with an internal stop and being positioned in apposition with the center of said second end and at a distance therefrom determined by the focal length of a selected lens.

* * * * *